United States Patent [19]

Erickson

[11] 4,333,748
[45] Jun. 8, 1982

[54] ROTARY GAS/LIQUID SEPARATOR

[75] Inventor: John W. Erickson, Huntington Beach, Calif.

[73] Assignee: Baker International Corporation, Orange, Calif.

[21] Appl. No.: 111,784

[22] Filed: Jan. 14, 1980

Related U.S. Application Data

[63] Continuation of Ser. No. 939,479, Sep. 5, 1978, abandoned.

[51] Int. Cl.³ .............................................. B01D 53/24
[52] U.S. Cl. ..................................... 55/202; 55/184; 415/188
[58] Field of Search ..................... 55/52, 55, 184, 191, 55/194, 199–207; 415/84, 89, 121 A, 168, 186, 188; 60/649

[56] References Cited

U.S. PATENT DOCUMENTS

| | | | |
|---|---|---|---|
| 2,216,939 | 10/1940 | Dodge | 55/205 X |
| 2,305,136 | 12/1942 | Campbell | 415/188 |
| 2,897,917 | 8/1959 | Hunter | 183/77 |
| 2,952,329 | 9/1960 | Cunningham et al. | 55/199 |
| 2,952,330 | 9/1960 | Winslow | 55/202 |
| 2,954,841 | 10/1960 | Reistle | 183/77 |
| 3,004,738 | 10/1961 | Peterson | 415/188 X |
| 3,091,183 | 5/1963 | Nahrgang | 55/199 |
| 3,249,227 | 5/1966 | Long | 55/199 X |
| 3,655,058 | 4/1972 | Novak | 210/360 |
| 3,867,056 | 2/1975 | Carte et al. | 415/168 X |
| 3,877,905 | 4/1975 | Novak | 55/404 |
| 3,877,906 | 4/1975 | Peterson | 55/404 |
| 3,879,949 | 4/1975 | Hays et al. | 60/649 |

Primary Examiner—Robert H. Spitzer
Attorney, Agent, or Firm—Christie, Parker & Hale

[57] ABSTRACT

A rotary gas/liquid separator includes a housing having a free running rotor mounted to rotate about a vertical axis in the housing. The rotor has an inverted conical inside surface, and a plurality of turbine blades adjacent an upper end of the conical inside surface. A gas/liquid inlet mixture is forced under pressure through stator vanes for directing flow of the inlet mixture tangentially into the turbine blades for rotating the rotor. The turbine blades divert the inlet mixture radially outwardly and then axially downwardly toward the conical inside surface of the rotor, and centrifugal force exerted on the inlet mixture by the rotating turbine blades separates liquid from the gas in the inlet mixture. The separated liquid flows downwardly in a thin film along the inside surface of the rotor and drips from a free lip at the bottom of the rotor for collection. A plurality of fan blades on the rotor discharge separated gas from a first chamber below the rotor to a second chamber above the rotor. A substantial pressure drop and corresponding adiabatic cooling of the gas results from passage of the gas through the turbine blades, and the fan blades increase the pressure and temperature of the gas in the second chamber relative to gas pressure and temperature in the first chamber.

36 Claims, 3 Drawing Figures

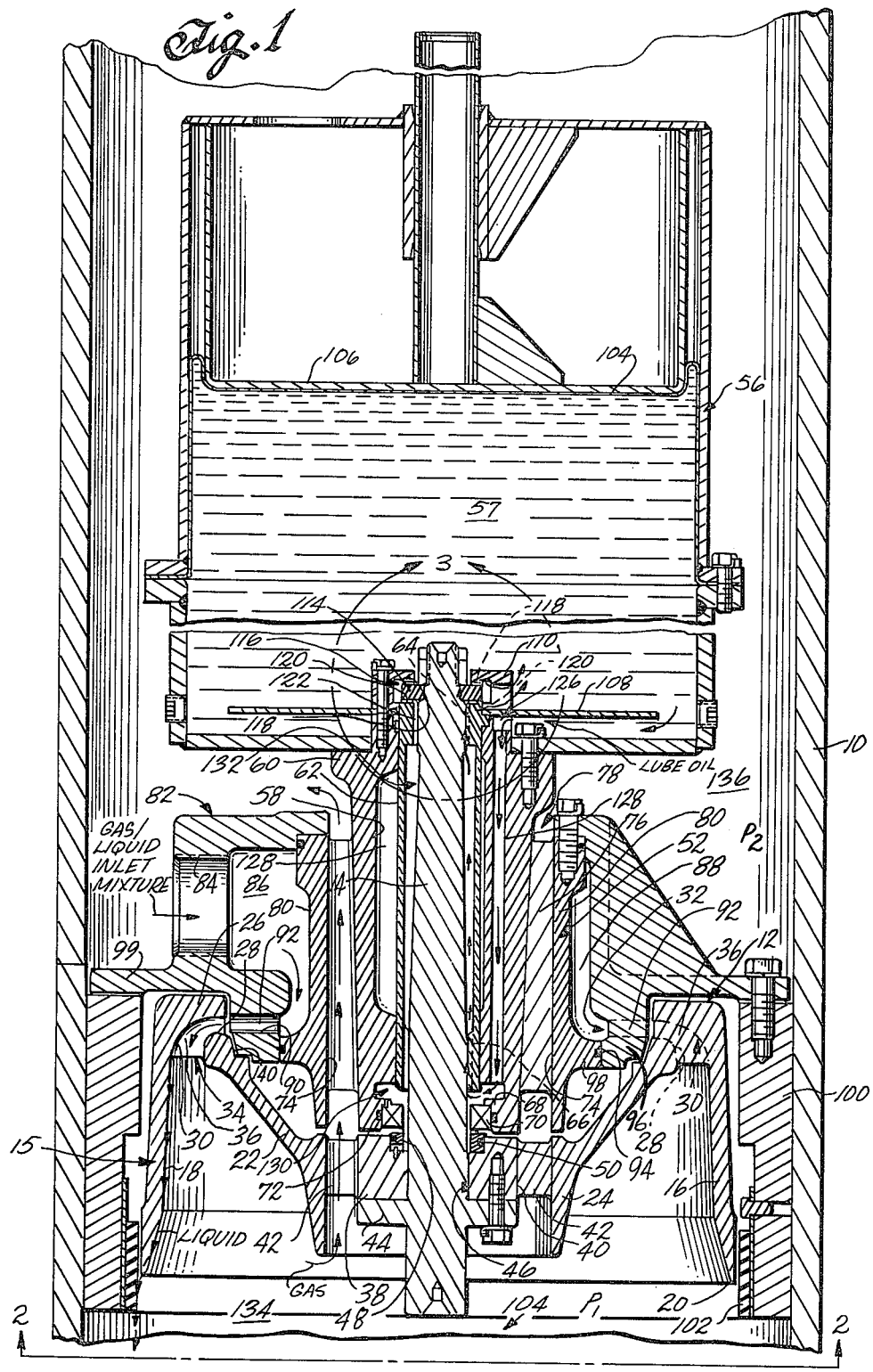

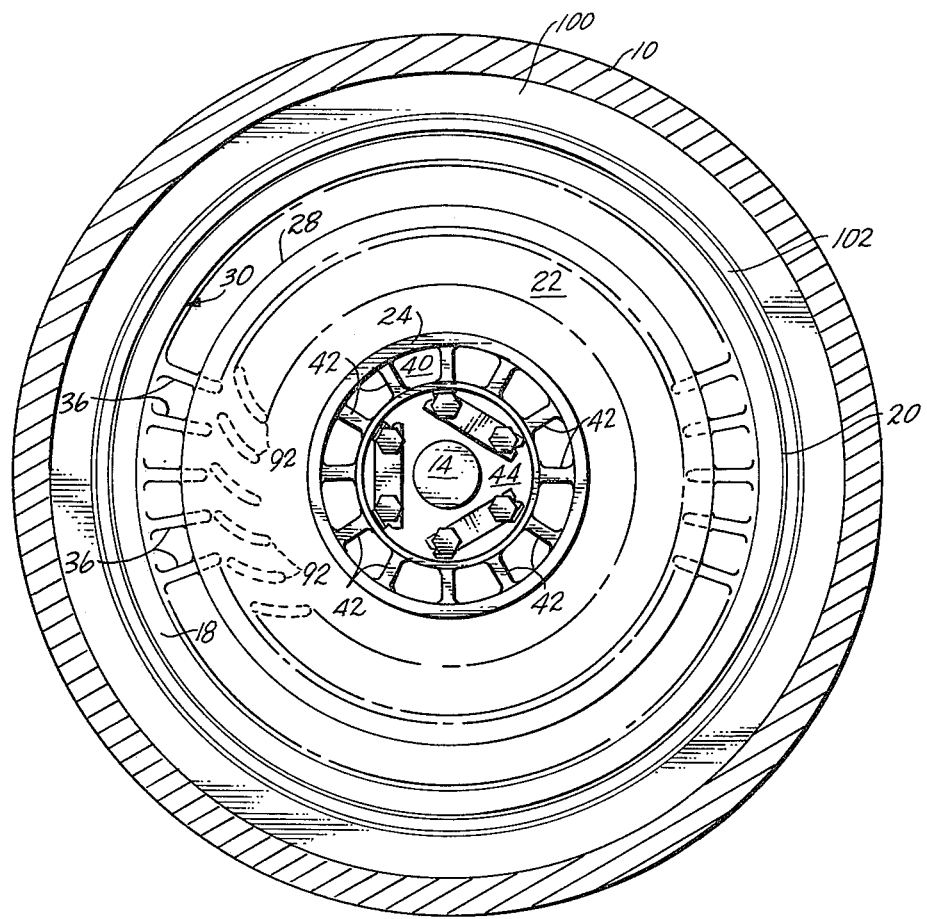
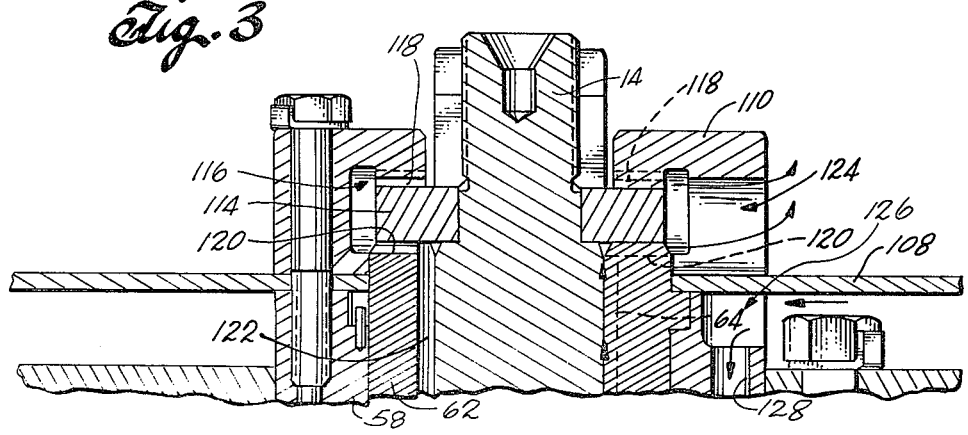

ROTARY GAS/LIQUID SEPARATOR

CROSS REFERENCE TO RELATED APPLICATIONS

This is a continuation of application Ser. No. 939,479, filed Sept. 5, 1978, now abandoned.

BACKGROUND

This invention relates to a gas/liquid separator particularly useful for separating crude oil and natural gas from recovered oil and gas wells.

In the past, various types of gas/liquid separators have been used in oil fields for separating valuable crude oil from natural gas in well fluids pumped from oil or gas wells.

The present invention provides a gas/liquid separator having a free running rotor. A gas/liquid inlet mixture, such as well fluid, can be admitted under pressure into the rotor for impinging on the rotor to rotate it about its axis. Impingement and centrifugal force exerted by the rotor on the inlet fluid can separate liquid from gas in the fluid.

U.S. Pat. No. 3,879,949 discloses a gas/liquid separator having a freely rotating ring for separating liquid from gas. The separated liquid is extracted from the periphery of the ring by a pitot tube. However, well fluid from oil or gas wells can contain iron particles, sand and other debris from an oil well, which could unduly erode a pitot tube.

There is a need to provide a gas/liquid separator which can effectively remove as much liquid as possible from gas in a gas/liquid inlet mixture. There is also a need to provide a separator which can effectively separate liquid, and particulate solids, from gas in well fluids without the need for using a pitot tube or similar pickup.

SUMMARY OF THE INVENTION

The present invention, according to one embodiment, provides a gas/liquid separator comprising a housing, and a free running rotor mounted for rotation about a vertical axis in the housing. The rotor has a downwardly diverging inside surface and a plurality of turbine blades adjacent an upper end of the inside surface. A gas/liquid inlet mixture is directed into the turbine blades for rotating the rotor about its axis and for exerting centrifugal force on the inlet mixture for separating liquid from the gas. A plurality of fan blades on the rotor are in gas communication with a chamber below the rotor for receiving separated gas. Rotation of the fan blades discharge gas from the chamber at a gas pressure higher than the pressure in the chamber.

In one embodiment of the invention, the inlet mixture is forced through one or more nozzles provided by a plurality of stator vanes for directing the inlet mixture into the turbine blades. The turbine blades act as a diffuser to produce a pressure drop and corresponding adiabatic cooling of separated gas evolved in the chamber below the rotor. The fan blades on the rotor withdraw separated gas from the chamber and act as a compressor for increasing the pressure and temperature of the separated gas.

DRAWINGS

These and other aspects of the invention will be more fully understood by referring to the following detailed description and the accompanying drawings, in which:

FIG. 1 is a fragmentary vertical cross-sectional view showing a gas/liquid separator constructed according to principles of this invention;

FIG. 2 is a transverse cross-sectional view taken on line 2—2 of FIG. 1; and

FIG. 3 is an enlarged fragmentary vertical cross-sectional view showing the apparatus within the circle 3 of FIG. 1.

DETAILED DESCRIPTION

FIG. 1 illustrates a vertical cross-section of an embodiment of a gas/liquid separator constructed according to principles of this invention. The gas/liquid separator includes a cylindrical outer housing 10 having a hollow interior. A rotor 12 is mounted for rotation about a vertical axis in the interior of the housing. The rotor surrounds an elongated vertical shaft 14 inside the housing. The rotor is rigidly affixed to the shaft so that the rotor and the shaft can rotate together about a vertical axis through the shaft.

The rotor includes a downwardly opening annular shell 15 spaced radially outwardly from the shaft. The shell is shaped generally as an inverted cone in vertical cross-section, as illustrated in FIG. 1. An outer wall of the shell is formed by an annular downwardly diverging outer rim 16. The rim has an inverted conical inside surface 18 which diverges downwardly and outwardly from an upper portion of the shell to a circular free lip 20 at the bottom of the rotor. The lip at the bottom of the rotor is termed a free lip in the sense that a film of liquid flowing downwardly under gravity along the conical inside surface 18 of the rim can drip freely under gravity from the bottom lip into a lower reservoir for collection.

An upper inside portion of the shell 15 is formed by an annular generally conical inner wall 22 which converges diagonally downwardly and inwardly toward the axis of the shaft 14 from an upper portion of the rim. A lower portion of the inner wall 22 is integral with an upper portion of a vertically extending ring 24 which surrounds a lower portion of the shaft. The vertical ring 24 forms a lower inside wall of the shell.

The top of the outer rim 16 is shaped generally as a hook forming an inwardly extending annular flange 26. An inside surface of the annular flange is spaced above and radially outwardly from an annular lip 28 at the top of the shell inner wall 22. This forms an annular radial-to-axial gas flow passage 30 between the inside surface of the flange and an outer portion of the lip. The radial-to-axial gas flow passage has a radially outwardly extending inner portion with an inlet 32 spaced relatively closer to the axis of the shaft 14 and a generally axially extending outer portion with an outlet 34 spaced relatively farther from the axis of the shaft. The radial-to-axial gas flow passage extends radially outwardly from the shaft and then curves to extend downwardly and generally axially adjacent an upper end of the inverted conical inside surface 18 of the shell.

A plurality of circumferentially spaced apart turbine blades 36 extend radially across the gas flow passage 30. The turbine blades are straight and extend radially outwardly on respective radii with respect to the axis of the shaft 14. That is, the radial extent of each turbine blade is on a radial line passing through the axis of the shaft 14. Each turbine blade is essentially continuous from the inlet to the outlet of the radial-to-axis gas flow passage 30. Thus, each turbine blade has an inner portion which extends radially outwardly from the shaft and then curves downwardly to form a generally axially extending outer portion adjacent the upper end of the inverted conical inside surface 18.

The inside portion of the rotor includes a mounting ring 38 rigidly affixed to a lower portion of the shaft. The outside of the mounting ring is spaced apart radially from the inside of the vertical ring 24 which forms the lower inside wall of the shell. This forms an annular gas flow passage 40 between the inside of the shell inner wall and the outside of the mounting ring. The rotor includes a plurality of circumferentially spaced apart fan blades 42 extending radially through the annular gas flow passage 40. Inside portions of the fan blades are integral with the outside of the mounting ring, and outer portions of the fan blades are integral with the inside of the vertical ring 24. Thus, the fan blades rotate with corresponding rotation of the rotor and the shaft, and the fan blades form a compressor stage at the lower inside portion of the rotor. The fan blades extend radially with respect to the axis of the shaft, i.e., the radial extent of the fan blades is on a line passing through the axis of the shaft. The mounting ring 38 is secured to a flange 44 at the lower portion of the shaft. The fan blades extend vertically upwardly continuously from a lower edge of the mounting ring to an upper edge of the mounting ring. The upper edges of the fan blades are essentially level with the upper edge of the lower vertical ring inside the shell.

A lower O-ring seal 46 seals a lower portion of the mounting ring to the shaft immediately above the flange 44. An upper portion of the mounting ring has an annular inside recess adjacent the shaft 14, and a seal facing ring 48 in the recess maintains an O-ring seal 50 against the recessed portion of the mounting ring.

The rotor is mounted for rotation below a fixed bearing housing 52 which contains a means for supplying bearing lubricant to bearings supporting the rotor shaft for rotation inside the bearing housing. The bearing housing also contains gas flow passages for diverting the flow of separated gas toward an outlet of the separator and for recovering the tangential velocity energy of the gas leaving the fan blades 42. The bearing housing is rigidly affixed to the base of a cylindrical reservoir 56 for containing a supply or bearing lubricant. The reservoir, shown primarily in vertical cross-section in FIG. 1, is fixed within the housing 10 above the portion of the separator shown in FIG. 1. The bearing housing 52 includes a cylindrical inner wall structure 58 having a flanged top portion 60 rigidly secured and sealed to the base of the reservoir 56. The inner wall structure 58 of the bearing housing extends downwardly from the reservoir and surrounds the shaft 14, terminating immediately above the top edge of the rotor mounting ring 38.

The inside of the inner wall structure 58 is spaced radially outwardly from the shaft 14, and the inner wall structure is supported on the outside of an elongated tubular shaft bearing 62 supported on the shaft 14. The tubular shaft bearing 62 has a fixed inwardly projecting bearing ring which carries an upper rotating bearing 64 which rotates with the rotor shaft 14. Similarly, a lower portion of the bearing tube has a fixed inwardly projecting lower bearing ring which carries a lower rotating bearing 66 which rotates with the shaft.

The inner wall structure 58 of the bearing housing 52 also includes an inwardly projecting bottom lip 68 which carries an annular seal ring 70 having a small annular clearance around the shaft immediately above the connection between the shaft and the rotor. The seal ring 70 maintains an O-ring seal 72 in contact with an inside annular edge of the bottom lip 68.

The bearing housing 52 includes preferably four circumferentially spaced apart elongated gas flow discharge passages 74 extending upwardly away from the fan blades 42 essentially parallel to the rotor shaft. The four gas flow discharge passages are curved when viewed from above. The discharge passages are each curved with the same radius centered on the axis of the shaft. The discharge passages are equal in length and equidistantly spaced apart within the bearing housing. The discharge passages are separated by four circumferentially spaced apart elongated vertically extending support ribs 76 which are equidistantly spaced apart within the bearing housing. The support ribs function as stationary blades which act as a diffuser helping to recover the velocity energy of the gas leaving the fan blades 42. Each discharge passage 74 has an inlet immediately above the top of the fan blades 42 and an outlet 78 between the inside wall structure 58 and an outer wall structure 80 of the bearing housing. The outer wall structure surrounds the inner wall structure 58 of the bearing housing, and the support ribs 76 support the outer wall structure around the inner wall structure.

An annular inlet housing 82 is affixed, in part, to the outer wall structure 80 of the bearing housing 52. An outer portion of the inlet housing includes a radially inwardly extending inlet port 84 for receiving flow of a gas/liquid mixture to be separated by the separator. The inlet port opens into an inner cavity 86 which is part of an annular gas flow inlet passage 88 formed between the inside of the inlet housing and the outside of the outer wall structure 80. A radial lower portion 90 of the annular inlet passage extends radially outwardly toward the inlet end of the radial-to-axial gas flow passage 30 and turbine blades 36 of the rotor 12. The radial lower portion 90 of the inlet passage includes a plurality of circumferentially spaced apart curved stator vanes 92. The stator vanes extend generally radially outwardly from the axis of the shaft 14, and when viewed in plan view, as in FIG. 2, the stator vanes are curved to direct flow of a gas/liquid inlet mixture generally tangentially into the turbine blades of the rotor. This causes the rotor to rotate about the axis of the shaft, and when viewed as in FIG. 2, rotation of the rotor is in a clockwise direction. Thus, the stator vanes are curved in the direction of rotation of the rotor as the stator vanes extend from relatively nearer the rotor axis to relatively farther from the rotor axis. The radial portion of the inlet passage and the stator vanes are spaced relatively closer to the axis of the shaft than the turbine blades on the rotor.

The radial portion 90 of the inlet passage is substantially reduced in transverse cross-section when compared with the inlet portion 84. The stator vanes 92 cooperate with the reduced area of the radial inlet passage to form circumferentially spaced apart jet nozzles for forcing a fluid inlet mixture radially outwardly under pressure into the turbine blades of the rotor. The jet nozzles provided by the stator vanes cooperate with the turbine blades of the rotor to form an impulse turbine, and a fluid inlet mixture directed through the nozzles against the turbine blades rotate the rotor and the shaft about the vertical axis of the shaft in response to impingement of the fluid inlet mixture on the turbine blades. The rotor is considered a free running rotor in the sense that no other means of motive power, other than the impingement force exerted on the rotor by the inlet fluid is required to rotate the rotor.

A flanged upper portion of the inlet housing is rigidly affixed and sealed to the top of the outer wall structure 80 of the bearing housing. An O-ring seal 94 seals an annular bottom lip 96 of the inlet housing to a flanged lower portion 98 of the bearing housing.

The inlet housing 82 has a peripheral flange 99 which rests on top of a mount ring 100 which is rigidly affixed inside the outer housing 10. The flange 99 is rigidly affixed to the top of the mount ring for securing the gas/liquid separator inside the housing. The rotor is thus able to rotate about the vertical axis of the shaft 14 within the confines of the mount ring 100. A rubber ring 102 is rigidly affixed to the inside of the mount ring and surrounds a lower edge of the rotor. A collection basin (not shown) is located within the housing below the bottom of the rotor.

Referring to FIG. 1, the reservoir 56 includes a flexible diaphragm 104 enclosing the bearing lubricant oil 57 contained in the reservoir. A movable piston 106 in an upper inside portion of the reservoir applies positive downward pressure on the diaphragm 104 for applying a slight positive pressure on the bearing lubricant so that the bearings do not run dry. A horizontally extending baffle plate or shroud 108 extends radially outwardly from an upper portion of the shaft bearing 62 into the lower portion of the reservoir.

A stationary thrust bearing 110 supports an upper portion of the fixed bearing housing 52 around the upper portion of the rotatable shaft 14. A rotatable thrust washer 114 is secured to the shaft above the bearing tube 62. The thrust washer is mounted against the rotatable upper portion of the upper bearing 64 in the bearing tube. The interior of the thrust bearing contains an annular lubricant circulating passage 116. A plurality of radial upper grooves 118 extend radially outwardly through an upper portion of the thrust bearing, and a plurality of similar radial lower grooves 120 extend radially outwardly through a lower portion of the thrust bearing. The upper radial grooves 118 provide fluid communication between the annular passage 116 in the thrust bearing and the lower inside portion of the reservoir. The lower grooves provide fluid communication between a plurality of vertical grooves 122 in the upper bearing 64 of the bearing tube 62 and the annular passage 116 in the thrust bearing. The annular passage in the thrust bearing is in fluid communication with an outlet port 124 for bearing lubricant passing outwardly from the thrust bearing into the lower portion of the reservoir. An inlet port 126 in an upper portion of the bearing housing provides an inlet for bearing lubricant below the baffle plate 108. The inlet port 126 provides an inlet to the top of a vertically extending annular outer bearing lubricant passage 128 extending through the bearing housing to an annular passage 130 at the bottom of the bearing tube 62. The annular passage 130 opens into the bottom of a vertically extending inner bearing lubricant circulating passage 132 which surrounds the rotor shaft 14 inside the bearing tube 62. The top of the inner lubricant passage 132 communicates with the bottom of the circumferentially spaced apart vertical bearing lubricant passages 122 which, in turn, provide for the passage of bearing lubricant through the radial lower grooves 120 in the thrust bearing 110.

In using the gas/liquid separator, a fluid inlet mixture of liquid and gas enters the inlet port 84 of the separator. The inlet mixture can contain a mixture of oil, water and natural gas introduced at an elevated inlet pressure of a few hundred psi. The inlet mixture is then forced radially outwardly through the nozzles provided by the stator vanes 92 for forcing the inlet fluid generally tangentially into the turbine blades. The impingement on the turbine blades provides motive power for rotating the rotor and the shaft about the vertical axis of the shaft. The inlet mixture passes radially outwardly through the turbine blades and is then diverted downwardly and outwardly by the turbine blades toward the upper end of the conical inside surface 18 of the rotor. The impingement force and the high centrifugal force exerted on the inlet mixture by the rotating turbine blades provide means for separating liquid from the gas in the inlet mixture.

The separated liquid flows downwardly under gravity in a thin film along the inverted conical inside surface 18 of the rotor. The thin film of liquid, together with its relatively long residence time in the rotor, are effective in allowing dissolved gas to be evolved inside the rotor shell. The separated liquid drips off the bottom lip of the rotor into the basin below the rotor for collection. The separated liquid also can be spun outwardly against the rubber ring 102 surrounding the lower edge of the rotor. The separated liquid can drip from the rubber ring to the collection basin. The free lip 20 at the base of the inverted conical rotor allows entrained solids to fall into the collection basin.

The inlet mixture passing through the turbine blades is diffused by the turbine blades into the inside of the rotor, and the elevated pressure of the inlet mixture is reduced substantially in the turbine blades in converting this energy to motive power for running the rotor. Substantially all of the gas pressure drop occurs across the turbine blades. There is essentially no pressure drop inside the rotor shell below the turbine blades. Gas which has been separated from the liquid passes into a first chamber 134 below the rotor. The pressure drop of gas separated by the turbine is accompanied by adiabatic cooling of the gas in the first chamber below the rotor. The lower temperature of the separated gas provides for improved condensation of any liquid which has not been separated from the gas by passage through the turbine, and any condensed liquid can fall under gravity into the collection basin below the rotor.

The gas separated from the liquid is withdrawn from the first chamber 134 from relatively near the shaft axis of rotation by the rotating fan blades 42 near the bottom inside of the rotor. The rotating fan blades draw the separated gas upwardly into the annular gas flow passage 40 in the bottom in the rotor. The gas drawn into the fan blades continues to be drawn upwardly through the discharge passages 74 between the fixed support ribs 76, and this gas passes outwardly into a second chamber 136 above the rotor and is eventually discharged through an outlet (not shown) from the separator housing. The rotating fan blades act as a compressor to raise the pressure of the separated gas so that gas pressure in the compressor stage, as well as in the second chamber 136, is greater than the gas pressure in the first chamber below the rotor. The temperature of the separated gas also is increased by its passage through the compressor stage. The increased pressure of gas drawn through the compressor aids in circulating separated gas away from the rotor and toward the outlet above the rotor. The increase in pressure and temperature of the compressed outlet gas also aids in drying the outlet gas to further remove any entrained liquid from the outlet gas.

A clearance 140 (see FIG. 1) is present between an annular edge of the rotor below the inside edges of the turbine blades 36 and an annular edge of the inlet housing 82 below the outside edges of the stator vanes 92. The head produced by the rotating fan blades 42 is as great or greater than the pressure in the inlet stream at the clearance 140. The head produced by the compressor stage thus inhibits any tendency of liquid in the inlet stream to pass through the clearance 140 and reach the discharge passage 74.

Since the free running rotor operates continuously for a substantial period of time, the bearing lubricant is continuously circulated from the reservoir to the bearings on the rotor shaft. Continuous rotation of the rotor produces a centrifugal pumping action of continuously circulating bearing lubricant from the reservoir to the bearings. The radial grooves in the thrust bearing rotate with the thrust bearing to cause the centrifugal pumping action which draws bearing lubricant into the bearing housing and discharges bearing lubricant from the radial grooves. Bearing lubricant is drawn below the baffle plate 108 into the inlet port 120 and then flows downwardly through the annular outer lubricant passage, into the annular passage 130 at the base of the bearing tube 62, and then upwardly to the lower bearing 66, into the inner lubricant passage 132, then to the upper bearing 64, and out through the lower grooves 120. Bearing lubricant also is drawn through the annular passage 116 in the thrust bearing and out through the upper radial grooves 118.

The gas/liquid separator can be adjusted for various flow rate levels by placing a removable stationary blankout strip (not shown) on the static portion of the separator adjacent the outlet of the jet nozzles (stator vanes 92). The blankout strip can be circularly curved and can extend for a predetermined distance to block off a desired number of jet nozzles.

Thus, the liquid/gas separator provides a free running rotor having turbine blades adjacent stator blades which cooperate to form an impulse turbine for supplying motive power to the free running rotor. A liquid/gas mixture passing through the turbine blades is separated, and liquid automatically can travel under gravity into a lower reservoir for collection. A substantial pressure drop occurs across the turbine, with corresponding adiabatic cooling of the separated gas for condensing liquid remaining in the separated gas. The compressor stage draws separated gas away from the rotor and increases the pressure of the discharged gas stream. The compressed gas also can be dried in the compressor stage and the compressor stage produces a head which opposes any tendency of liquid from the inlet stream to leak into the gas discharge passages on the outlet side of the compressor stage. The free running rotor automatically produces a continuous oil pumping system for supplying bearing lubricant to the bearings of the rotor.

What is claimed is:

1. A gas/liquid separator comprising:
a housing;
a free-running rotor mounted for rotation about a vertical axis in the housing, the rotor having a downwardly extending inside surface and being open at its lower end;
means for directing a gas/liquid mixture into the inside of the rotor for rotating the rotor;
a chamber in the housing below the rotor for receiving separated gas and liquid; and
a plurality of fan blades on the rotor in gas communication with the chamber for discharging gas from the chamber at a pressure higher than the pressure in the chamber.

2. A gas/liquid separator according to claim 1 including a free lip at the bottom of the inside surface for discharging liquid into the chamber.

3. A gas/liquid separator according to claim 1 comprising a plurality of turbine blades on the rotor adjacent an upper end of the inside surface, and wherein the means for directing a mixture into the rotor comprises at least one nozzle for directing a gas/liquid mixture under pressure against the turbine blades.

4. A gas/liquid separator according to claim 3 in which such a nozzle comprises means for directing the gas/liquid mixture outwardly from a nozzle inlet relatively nearer the rotor axis toward a nozzle outlet relatively farther from the rotor axis.

5. A gas/liquid separator according to claim 4 in which the turbine blades are spaced farther from the rotor axis than the outlet of the nozzle.

6. A gas/liquid separator according to claim 1 including a second chamber above the rotor, and in which the fan blades discharge separated gas upwardly from the chamber below the rotor to the second chamber at a gas pressure higher than the pressure in the chamber below the rotor.

7. A gas/liquid separator according to claim 1 wherein the rotor includes a shaft; bearing means supporting the rotor on the shaft; a reservoir for containing a bearing lubricant; and means for diverting bearing lubricant from the reservoir to the bearing means for lubricating the bearing means.

8. A gas/liquid separator according to claim 7 including means for applying a positive pressure to bearing lubricant in the reservoir.

9. A gas/liquid separator according to claim 8 including a bearing lubricant passage for circulating bearing lubricant to the bearing means; and centrifugal pump means communicating with the bearing lubricant passage and rotating with rotation of the shaft for causing bearing lubricant to flow through the bearing lubricant passage.

10. A gas/liquid separator according to claim 1 wherein the inside surface of the rotor diverges downwardly.

11. A gas/liquid separator according to claim 1 further comprising a plurality of turbine blades on the rotor adjacent an upper end of the inside surface.

12. A gas/liquid separator comprising:
a housing having an inlet for a gas/liquid mixture to be separated;
a rotor mounted for rotation about a vertical axis in the housing, the rotor having an inside peripheral surface;
a plurality of turbine blades on the rotor adjacent an upper end of the inside peripheral surface of the rotor;
means between the inlet and the turbine blades for directing a gas/liquid mixture into the turbine blades for rotating the rotor for exerting centrifugal force on the gas/liquid mixture to separate the liquid from the gas such that the separated liquid flows downwardly under gravity along the inside peripheral surface of the rotor; and
compressor means on the rotor for discharging separated gas from a portion of the rotor below the turbine blades.

13. A gas/liquid separator according to claim 12 wherein the compressor means discharges separated gas at a pressure at least as great as the pressure of the gas/liquid mixture at the entrance to the turbine blades.

14. A gas/liquid separator according to claim 12 including a first chamber inside the rotor below the turbine blades for receiving separated gas; and a second chamber above the rotor; and in which the compressor means rotate with the rotor to discharge separated gas upwardly from the first chamber to a gas pressure in the second chamber higher than the gas pressure in the first chamber.

15. A gas/liquid separator according to claim 12 wherein the inside surface of the rotor is generally conical and diverges downwardly to a free lip at the bottom of the rotor to permit separated liquid and solids in the liquid to fall under gravity from the bottom of the lip.

16. A gas/liquid separator according to claim 12 in which the compressor means comprises a plurality of fan blades on the rotor spaced closer to the rotor axis than the turbine blades.

17. A gas/liquid separator comprising:
a housing having an inlet;
a free-running rotor mounted for rotation about a vertical axis in the housing, the rotor having a downwardly diverging conical inside surface and being open at its lower end;
a first chamber in the housing below the conical inside surface of the rotor;
a second chamber in the housing above the rotor;
means connected to the inlet for directing flow of a gas/liquid inlet mixture into an upper end of the rotor partially radially outwardly from the rotor axis and partially tangentially for rotating the rotor; and
a plurality of fan blades on the rotor spaced relatively closer to the rotor axis than the inside surface and extending from the first chamber toward the second chamber for discharging gas upwardly from the first chamber to a pressure in the second chamber higher than the pressure in the first chamber.

18. A gas/liquid separator according to claim 17 including a free lip at the bottom of the rotor.

19. A gas/liquid separator comprising:
a hollow free-running rotor in the general form of an inverted bowl mounted for rotation about a vertical axis;
a chamber below the rotor;
inlet means for introducing a gas/liquid inlet mixture partially radially outwardly into an upper portion of the hollow rotor with a sufficient tangential component for rotating the rotor whereby gas and liquid are separated in the rotor;
means for discharging separated liquid from a lower portion of the rotating rotor into the chamber;
means for withdrawing separated liquid from the chamber; and
means for withdrawing separated gas from below the rotor.

20. A gas/liquid separator according to claim 19 including a second chamber above the rotor, and fan means on the rotor for discharging separated gas upwardly from below the rotor to the second chamber at a gas pressure higher than the gas pressure in the chamber below the rotor.

21. A gas/liquid separator as recited in claim 19 further comprising means on the rotor for withdrawing gas from the chamber including means for increasing gas pressure to a pressure greater than pressure in the chamber.

22. A gas/liquid separator as recited in claim 19 wherein the inside surface of the hollow rotor diverges in a downward direction.

23. A gas/liquid separator comprising:
a housing;
a free-running hollow rotor mounted for rotation about a vertical axis in the housing, the rotor having a downwardly facing open end;
means for introducing a gas/liquid mixture into the rotor adjacent an upper end of the rotor partially in a radially outward direction and partially in a tangential direction for rotating the rotor and centrifugally separating gas and liquid;
a chamber below the rotor for receiving separated gas and liquid from the open end of the rotor; and
means for separately withdrawing gas and liquid from the chamber.

24. A gas/liquid separator as recited in claim 23 wherein the means for withdrawing gas comprises fan means on the rotor for increasing pressure of gas withdrawn from the chamber.

25. A gas/liquid separator as recited in claim 23 wherein the rotor comprises a downwardly diverging inside peripheral wall extending at least between the open end and the means for introducing gas/liquid mixture into the rotor.

26. A gas/liquid separator as recited in claim 25 having a free lip at the open lower end of the rotor over which liquid can flow from the peripheral wall and a rubber ring surrounding the lower end of the rotor.

27. A gas/liquid separator as recited in claim 23 wherein the hollow rotor includes a generally conical inside peripheral wall.

28. A gas/liquid separator comprising:
a housing;
a free-running rotor mounted for rotation about a vertical axis in the housing, the rotor having a downwardly extending inside surface including a free lip at the bottom of the inside surface;
means for directing a gas/liquid mixture into an upper portion of the inside of the rotor for rotating the rotor so that gas and liquid are separated in the rotor and liquid travels downwardly along the inside surface of the rotor over the free lip;
a chamber below the rotor for receiving separated gas and liquid; and
means for separately withdrawing gas and liquid from the chamber.

29. A gas/liquid separator as recited in claim 28 wherein the inside surface of the rotor diverges downwardly.

30. A gas/liquid separator as recited in claim 29 wherein the inside surface comprises a generally conical portion.

31. A gas/liquid separator as recited in claim 29 further comprising a rubber ring on the housing surrounding the free lip.

32. A gas/liquid separator as recited in claim 28 wherein the means for withdrawing gas comprises fan means on the rotor for increasing pressure of gas withdrawn from the chamber.

33. A gas/liquid separator comprising:
a housing;
a free-running hollow rotor mounted for rotation about a vertical axis in the housing, the rotor having a downwardly extending inside surface;

means adjacent an upper end of the inside surface of the rotor for directing flow of a gas/liquid inlet mixture partially in a radially outward direction and partially in a tangential direction for rotating the rotor and centrifugally separating gas and liquid in the rotor;

a first chamber in the housing below the inside surface of the rotor for receiving separated gas and liquid from the rotor;

a second chamber in the housing above the rotor; and passage means through the rotor extending from the first chamber toward the second chamber including a plurality of fan blades for discharging gas upwardly from the first chamber to a pressure in the second chamber higher than the pressure in the first chamber.

34. A gas/liquid separator according to claim 33 including a free lip at the bottom of the rotor.

35. A gas/liquid separator as recited in claim 33 wherein the inside surface of the rotor diverges in a downward direction.

36. A gas/liquid separator according to claim 33 wherein the inside surface of the rotor is generally conical and diverges downwardly to a free lip at the bottom of the rotor to permit separated liquid and solids in the liquid to fall under gravity from the bottom of the lip.

* * * * *